United States Patent [19]

Pyle

[11] Patent Number: 4,467,686
[45] Date of Patent: Aug. 28, 1984

[54] DEVICE FOR PROTECTING AN ORIENTABLE CIRCULAR SAW OR LIKE TOOL

[75] Inventor: Stoddard H. Pyle, Corvallis, Oreg.

[73] Assignee: Excor, Inc., Corvallis, Oreg.

[21] Appl. No.: 528,868

[22] Filed: Sep. 6, 1983

Related U.S. Application Data

[63] Continuation of Ser. No. 224,062, Jan. 12, 1981.

[30] Foreign Application Priority Data

Jul. 18, 1980 [FR] France .................. 80 15916

[51] Int. Cl.³ .................. B27B 5/20; B27G 19/04
[52] U.S. Cl. .................. 83/478; 83/471.3; 83/546; 83/860
[58] Field of Search .................. 83/478, 471.3, 546, 83/486.1, 860, 544

[56] References Cited

U.S. PATENT DOCUMENTS

| | | | |
|---|---|---|---|
| 2,926,709 | 3/1960 | Kaley | 83/478 |
| 3,754,493 | 8/1973 | Niehaus et al. | 83/478 |
| 3,821,918 | 7/1974 | Niehaus et al. | 83/478 X |
| 4,043,237 | 8/1977 | Pyle | 83/478 |

Primary Examiner—Donald R. Schran
Attorney, Agent, or Firm—Marshall, O'Toole, Gerstein, Murray & Bicknell

[57] ABSTRACT

The invention relates to a device for guarding the blade of an orientable circular saw or like tool, already provided with an upper guard constituted by a sheath element enveloping the upper part of the blade, said device further comprising a piece of rigid transparent material laterally and frontally enveloping, at least transversely with respect to the plane of the saw blade, that portion thereof directed towards the sawyer, and comprising side and front walls inclined from the outside towards said tool and from bottom to top, means being provided for fixing said piece of transparent material on said upper guard.

9 Claims, 13 Drawing Figures

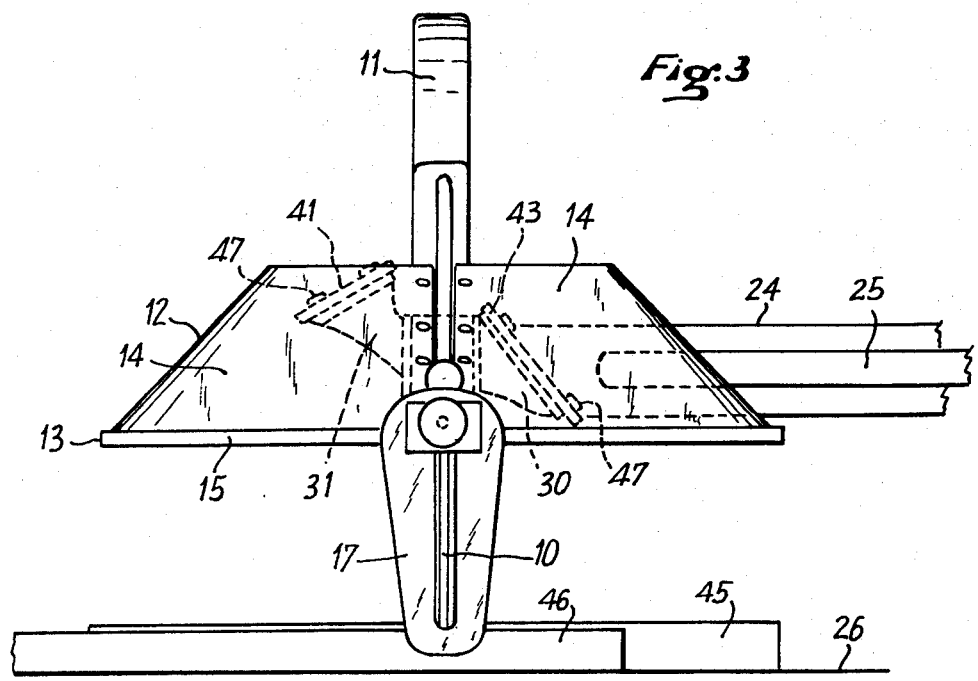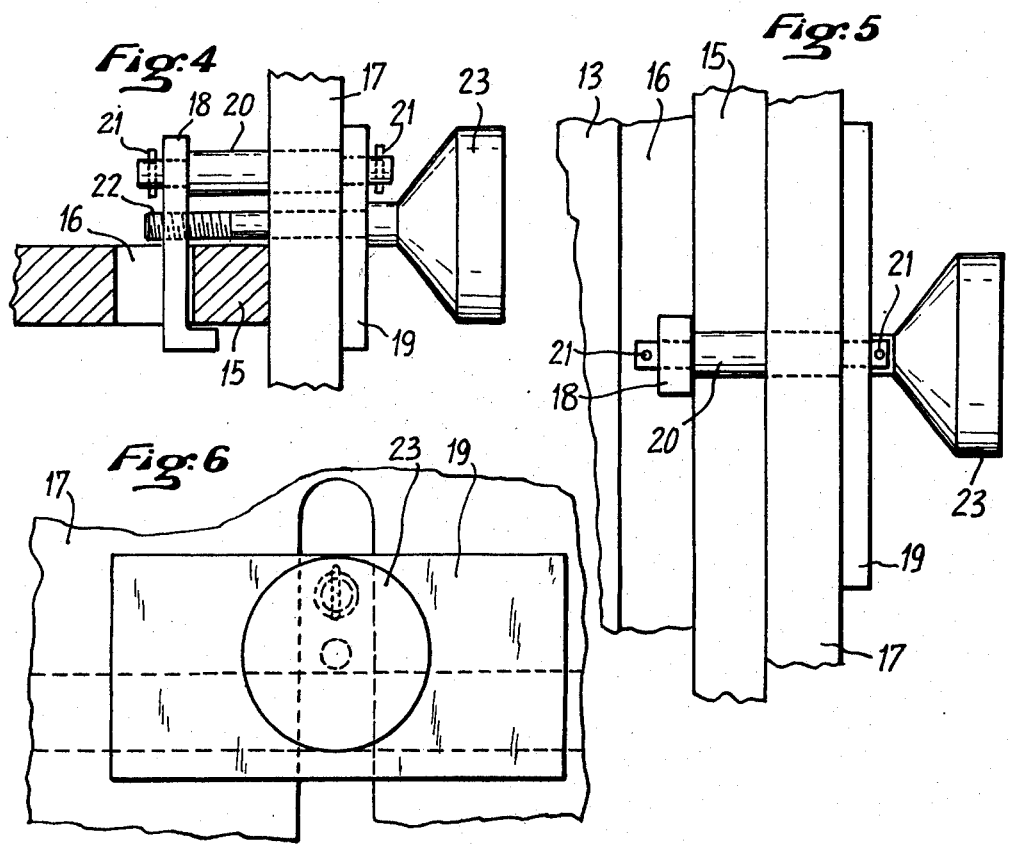

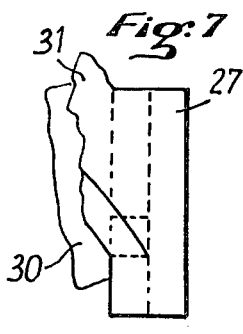
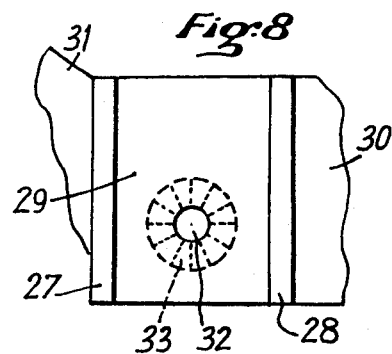
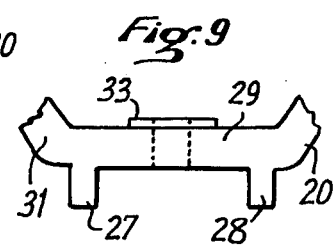
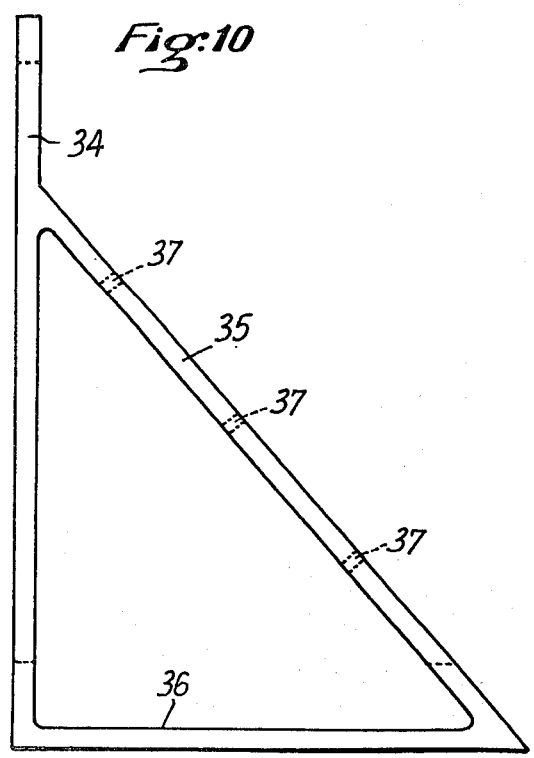
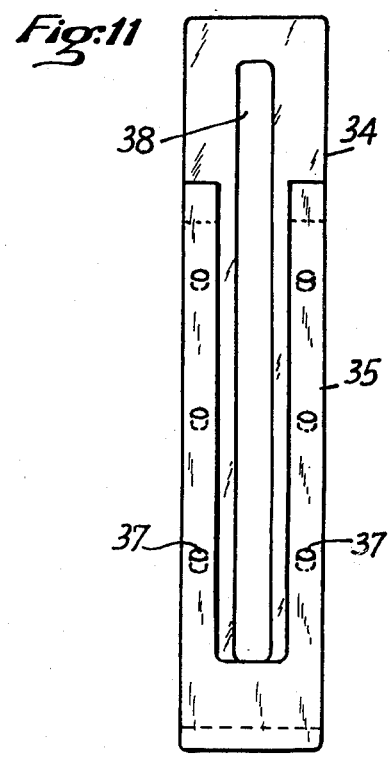
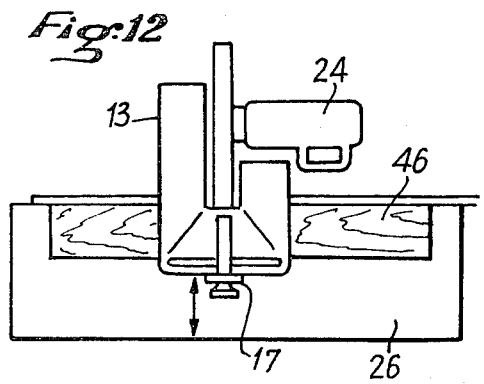
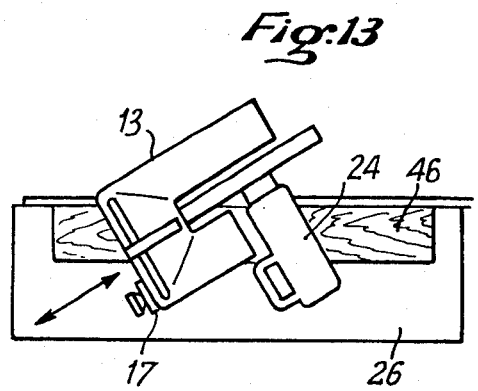

DEVICE FOR PROTECTING AN ORIENTABLE CIRCULAR SAW OR LIKE TOOL

This application is a continuation of application Ser. No. 224,062, filed Jan. 12, 1981.

The present invention relates to a device for guarding an orientable circular saw, particularly of the type comprising a blade mounted at the end of a normally horizontal axial arm, rotable about a vertical axis and possibly a horizontal axis, in order to allow the angle of cut of the saw to be adjusted both in a direction parallel to the vertical diameter thereof, and in a direction parallel to the horizontal diameter of said saw.

A guard device for such a saw must offer efficient protection while avoiding limiting the possibilities of use thereof and avoiding the risk of injuring the sawyer.

U.S. Pat. No. 4,043,237 describes an improved guard device enabling these results to be obtained.

It is an object of the present invention to provide an improved guard device eliminating the parallax caused by the saw blade and the work piece being viewed through a transparent guard piece at an inclined angle. A further object of the present invention is to provide a barrier between the sawyer and the saw blade, yet allow the sawyer the freedom to operate the machine with a minimum of restrictions both at a cutting angle of 90° and at shallow angles of cut, as is required when cutting roofing components such as rafters, tie-beams, braces, etc .... It is a further object of the present invention to provide means for adjustably mounting the guard device so that it can be raised or lowered to accomodate workpieces of various thicknesses, and for tilting the saw blade in relationship to the workpiece while providing maximum protection for the sawyer. It is a further object of the invention to provide means for avoiding the accumulation of sawdust on the viewing portion of the guard that may obscure the saw blade and work piece from the sawyer.

To these ends, according to the invention, the device, for guarding an orientable circular saw blade or like tool, already provided with an upper guard constituted by a sheath element enveloping the upper part of the blade, is noteworthy in that it further comprises a piece of rigid transparent material laterally and frontally enveloping, at least transversely with respect to the plane of the saw blade, that portion thereof directed towards the sawyer, and comprising side and front walls inclined from the outside towards said blade and from bottom to top, and in that means are provided for fixing said piece of transparent material on said upper guard.

Said means for fixing said transparent piece on the upper guard are preferably provided to allow said piece to rotate about an at least substantially horizontal axis, as well as to slide at least substantially vertically.

In an advantageous embodiment of said fixing means, they comprise a first bracket in the form of a right-angled triangle of which the hypotenuse is fixed to the front wall of said transparent piece and of which the vertical side of the right angle may slide parallel to itself, being guided by a second bracket fixed on the upper guard so as to be able to occupy a plurality of inclined positions with respect to the plane of the saw blade. To this end, said hypotenuse and said right angle side of the first bracket, as well as the front wall of the transparent piece, are provided with aligned slots through which a shaft passes, which, moreover, passes through the second bracket to fix the latter on the upper guard. This shaft ensures both the fixing of the first bracket on the second bracket and the fixing of the second bracket on the upper guard.

The mating surface portions of the guard and the second bracket advantageously comprise cooperating sets of radial ridges and grooves to allow the second bracket (and therefore the first bracket and the transparent piece) to take a plurality of distinct positions of different inclinations about said shaft.

In order to allow the rotation of the transparent piece with respect to the plane of the saw blade, this transparent piece surrounds the said blade with considerable clearance and safety panels are provided on the second bracket to fill said clearance.

The device according to the invention may further comprise a downwardly directed barrier plate adapted to slide both along the edge of said front panel and at right angles to this edge.

The axis of rotation of the transparent piece and the axis of the saw blade preferably form a plane parallel to the work table of the machine comprising the saw.

The invention will be more readily understood on reading the following description with reference to the accompanying drawings, in which FIG. 1 is a side view of the device of the invention, for a right-angled cut.

FIGS. 2 and 3 respectively show a plan view and a front view of the device of FIG. 1.

FIGS. 4, 5 and 6 respectively illustrate, in side, plan and front view, the system for adjusting the lower barrier plate.

FIGS. 7 to 11 illustrate the system for fixing the transparent piece on the upper guard, FIGS. 10 and 11 being side and front views, respectively, of the first bracket, while FIGS. 7, 8 and 9 are partial side, front and plan views, respectively, of the second bracket.

FIGS. 12 and 13 are schematic plan views illustrating different positions of cut.

In these Figures, like references indicate like elements.

Figure 1:
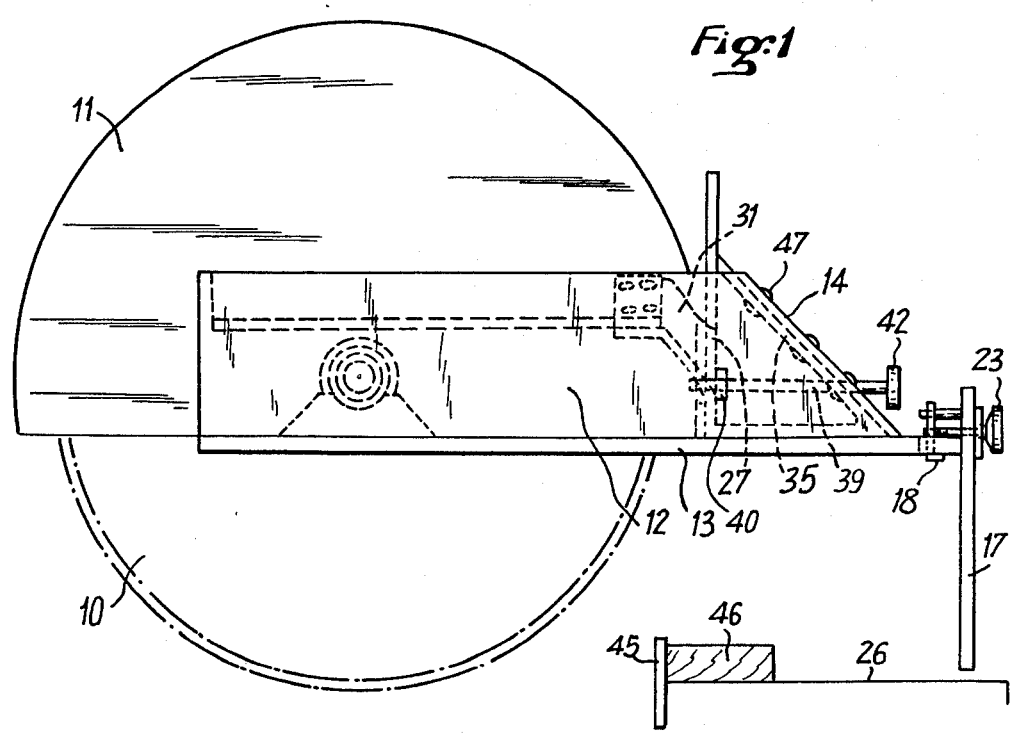
Figure 2:
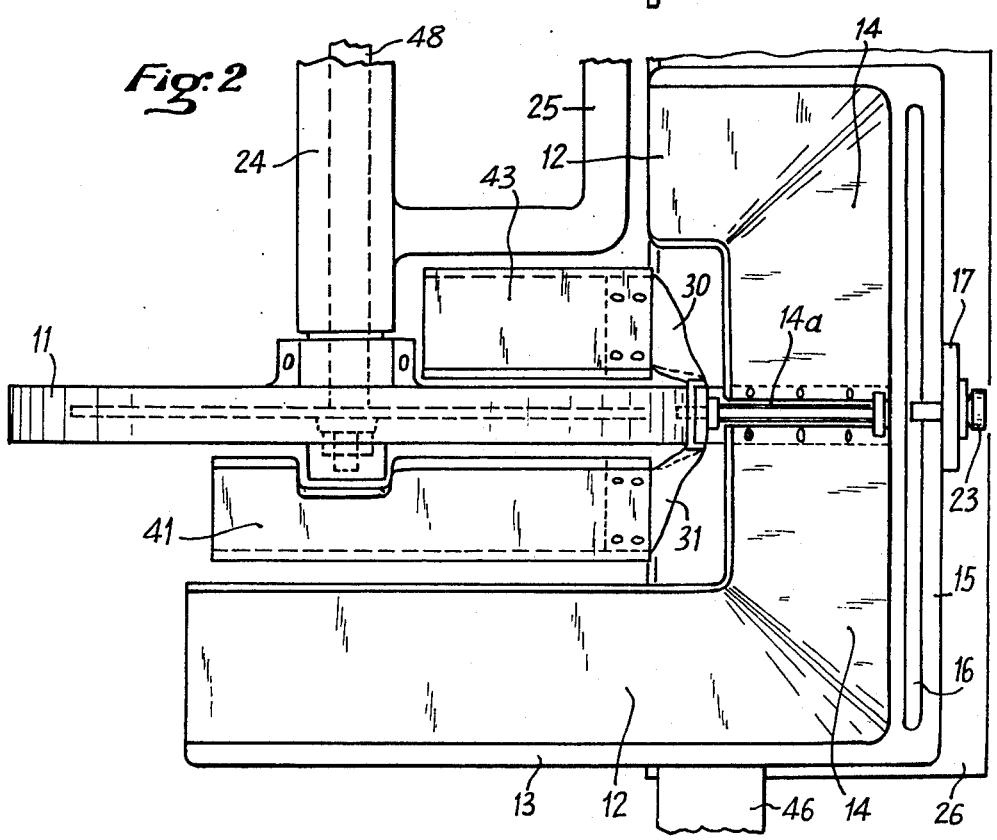

Referring now to the drawings, the part of the sawing machine shown in FIGS. 1 to 3 comprises a circular blade 10, mounted at the end of an arbor 48 rotated by known means (not shown). Similarly, with the aid of known means (not shown), the circular blade 10 may be orientated in a direction parallel to its horizontal diameter, and in a direction parallel to its vertical diameter. The arbor 48 is enclosed in an arbor housing 24 provided with a handle 25 enabling the sawyer to move the saw blade 10 with respect to a workpiece 46 disposed on a fixed table 26 fast with the frame of said sawing machine.

The upper part of the blade 10 is protected by a semicircular sheath element 11 of known type detachably connected to the arbor housing 24. This sheath element 11 forms an upper guard.

The lower guard device 13 according to the invention is made of transparent material and comprises sloping side panels 12 disposed on either side of the blade 10, and a sloping front panel 14 connecting said side panels and disposed between the blade 10 and the sawyer. A peripheral rail 15 runs along the lower outer edge of the side panels 12 and the front panel 14.

The front panel 14 comprises a slot 14a whose edges are fixed to a bracket 35 provided with a slot 38, for example by means of rivets 47 (cf. FIGS. 10 and 11). The slotted bracket 35 may slide in guides 27 and 28 (cf. FIGS. 7, 8 and 9), fast with a guide frame 29 adapted to rotate about a shaft 39, passing through the slots 14a, in register, of the front panel 14 and 38 of the bracket 35 (cf. FIG. 8).

One end of the shaft 39 is threaded, passes freely through a hole 32 in the frame 29 and is screwed in a corresponding threaded hole in the upper guard 11, so as to connect the bracket 35 and the guide frame 29 in adjustable relationship with respect to the upper guard 11, by means of a collar 40 when a knob 42 provided at the free end of the shaft 39 is rotated.

The face 33 of the frame 29 directed towards the upper guard 11 is provided, around the hole 32, with grooves complementary to ridges on the mating piece of the upper guard 11. Thus, the frame 29 may occupy a plurality of distinct positions, with respect to the guard 11, corresponding to different rotations of said frame about the shaft 39. The slot 38 of the bracket 35 enables said bracket to be raised or lowered in relationship to the upper guard 11.

Collar 40 of the shaft 39 bears against the vertical rear leg 34 of the slotted bracket 35. Safety panels 41 and 43 are fixed on projecting wings 31 and 30 of the frame 29, by means of rivets 47. The panels 41 and 43 rotate in synchronism with the frame 29 and therefore with the lower guard 13. The lower guard 13 may rotate through 45° clockwise with respect to the upper guard 11, about the shaft 39. The panels 41 and 43 form a protective barrier against inadvertent entry through the widely open upper part of the lower guard 13. They also form a protective barrier when the lower guard 13 is lowered with respect to the upper guard 11.

A guide slot 16 running along the front panel 14 is formed in the peripheral rail 15. A downwardly directed barrier plate 17 is connected to the rail 15 so as to be able to slide along the guide slot 16, as shown in greater detail in FIGS. 4 to 6. Two plates 18 and 19, disposed on either side of the barrier plate 17, are connected to each other by a double-shouldered shaft 20 and retained by roll pins 21, plate 18 being introduced into slot 16. A threaded shaft 22 controlled by a knob 23 is screwed in a threaded hole in the plate 18, this adjustably clamping barrier plate 17 to the guide rail 15. The barrier plate 17 comprises a vertical slot 17a which enables it to be raised or lowered in order to accomodate various heights of the lower guard 13 above the work table 26. For maximum protection, it is intended that the bottom edge of the lower guard 13 be set approximately 0.5 cm above the workpiece 46, whilst the plate 17 be set approximately 0.5 cm above the work table 26.

When the plate 17 is set in the manner described, it forms a tunnel which avoids the saw blade 10 coming into contact with the sawyer's arm or hand. This plate 17 may be moved along the rail 15, either to the left or right, as a function of the angle of cut of the blade 10, so that this plate 17 may remain at the desired height above the work table 26, between the work piece 46 and the sawyer, as schematically illustrated in the plan views of FIGS. 12 and 13.

The pivot shaft 39 is set in the plane of the saw 10 and forms with the axis of rotation of the arbor 48 a plane parallel to the work table 26 in order to minimise the viewing restrictions to the sawyer. The slope of the front panel 14 is provided for a nominal working height of work table 26 and for a standard height of sawyer, when the latter's left-hand is on the workpiece 46 and right hand is on handle 25. The sloping surface of the front panel 14 avoids the accumulation of sawdust in the viewing area.

The preceding description has, of course, been given solely by way of illustration and it is not intended to be restrictive.

What is claimed is:

1. In an orientable circular saw or like tool having a rotatable blade and an upper guard comprising a sheath element enveloping the upper part of the blade, a device for guarding the exposed lower portion of said blade comprising:

a piece of rigid transparent material laterally and frontally blocking the exposed lower portion of said blade directed towards a sawyer, said piece of transparent material having a front wall and two opposed side walls, each of which is inclined from the outside toward said blade from bottom to top, fixing means for attaching said piece on said upper guard, said means permitting vertical positioning of said piece relative to said upper guard and rotation thereof about a substantially horizontal axis lying substantially within the plane of said blade, said piece having substantial lateral clearance on both sides of said upper guard to permit such rotation, and first and second panel means affixed to said attaching means and extending laterally along opposite sides of said upper guard to fill said clearance.

2. The device of claim 1, wherein said fixing means comprise a first bracket in the form of a right-angled triangle of which the hypotenuse is fixed to the front wall of said transparent piece and of which the vertical side of the right angle may slide parallel to itself, being guided by a second bracket fixed on the upper guard so as to be able to occupy a plurality of inclined positions with respect to the plane of the saw blade.

3. The device of claim 2, wherein said hypotenuse and said right-angle side of the first bracket, as well as the front wall of the transparent piece, are provided with aligned slots, through which a shaft passes, which, moreover, passes through the second bracket to fix the latter on the upper guard.

4. The device of claim 3, wherein said shaft ensures both the fixing of the first bracket on the second and the fixing of the second bracket on the upper guard.

5. The device of claim 3, wherein the surface portions of the guard and the second bracket comprise cooperating sets of radial ridges and grooves to allow said second bracket to take a plurality of distinct positions of different inclination about said shaft.

6. The device of claim 1, comprising a downwardly directed barrier plate adapted to slide along the edge of said front wall at right angles to said edge.

7. The device of claim 1, wherein the axis of rotation of the transparent piece and the axis of the saw blade form a plane parallel to the work table of the machine comprising said saw.

8. In a orientable circular saw or like tool having a rotatable blade an upper guard comprising a sheath element enveloping the upper part of the blade, a device for guarding the exposed lower portion of said blade comprising:

a piece of rigid transparent material laterally and frontally blocking the exposed lower portion of said blade directed towards a sawyer, said piece of transparent material having a front wall and two opposed side walls, each of which is inclined from the outside toward said blade from bottom to top, fixing means for attaching said piece on said upper guard, said means permitting vertical positioning of said piece relative to said upper guard and rotation thereof about a substantially horizontal axis lying substantially within the plane of said blade, said piece having substantial lateral clearance on both sides of the upper guard to permit such rotation, said fixing means comprising a first bracket in the form of a right-angled triangle of which the hypotenuse is fixed to the front wall of said transparent piece and of which the vertical side of the right angle may slide parallel to itself, being guided by a second bracket fixed on the upper guard so as to be able to occupy a plurality of inclined positions with respect to the plane of the saw blade, said hypotenuse, said right angle side and said front wall of said transparent piece being provided with aligned slots through which a shaft passes, said shaft serving to fix said second bracket to said upper guard.

9. The device of claim 8 wherein said shaft also serves to fix said first bracket on said second bracket.

* * * * *